(12) United States Patent
Jung

(10) Patent No.: US 12,472,599 B2
(45) Date of Patent: Nov. 18, 2025

(54) SAG COMPENSATION APPARATUS OF MACHINE TOOL AND MACHINE TOOL INCLUDING SAME

(71) Applicant: DN SOLUTIONS CO., LTD., Changwon-si (KR)

(72) Inventor: Youngkun Jung, Changwon-si (KR)

(73) Assignee: DN SOLUTIONS CO., LTD., Changwon-si (KR)

( * ) Notice: Subject to any disclaimer, the term of this patent is extended or adjusted under 35 U.S.C. 154(b) by 474 days.

(21) Appl. No.: 17/920,580

(22) PCT Filed: Apr. 22, 2021

(86) PCT No.: PCT/KR2021/005104
§ 371 (c)(1),
(2) Date: Oct. 21, 2022

(87) PCT Pub. No.: WO2021/215848
PCT Pub. Date: Oct. 28, 2021

(65) Prior Publication Data
US 2023/0158625 A1 May 25, 2023

(30) Foreign Application Priority Data
Apr. 23, 2020 (KR) ........................ 10-2020-0049667

(51) Int. Cl.
*B23Q 15/22* (2006.01)
*B23Q 11/00* (2006.01)
*B23Q 23/00* (2006.01)

(52) U.S. Cl.
CPC .......... *B23Q 15/22* (2013.01); *B23Q 11/0025* (2013.01); *B23Q 23/00* (2013.01)

(58) Field of Classification Search
CPC ............ B23Q 11/0025; B23Q 11/0017; B23Q 11/0028; B23Q 23/00; B23Q 1/012
See application file for complete search history.

(56) References Cited

FOREIGN PATENT DOCUMENTS

| | | |
|---|---|---|
| CN | 106425535 B | 1/2019 |
| JP | 2007022692 A | 2/2007 |
| JP | 2007216319 A | 8/2007 |
| KR | 200245760 Y1 | 10/2001 |
| KR | 20170132594 A | 12/2017 |

OTHER PUBLICATIONS

English translation of JP 2007216319 (Year: 2007).*
International Search Report of PCT/KR2021/005104, Jul. 23, 2021, English translation.

* cited by examiner

*Primary Examiner* — Alan Snyder
(74) *Attorney, Agent, or Firm* — STIP Law Group, LLC

(57) ABSTRACT

The present disclosure relates to a sag compensation apparatus of a machine tool and a machine tool including the same, in which in case of sag of a cross-rail occurring due to transfer of a saddle and a ram spindle unit, hydraulic pressure compensates for the sag in real time, thereby improving machining precision and maximizing responsiveness and reliability.

10 Claims, 9 Drawing Sheets

SAG COMPENSATION APPARATUS OF MACHINE TOOL AND MACHINE TOOL INCLUDING SAME

CROSS-REFERENCE TO RELATED APPLICATIONS

This application is the U.S. National Phase under 35 U.S.C. § 371 of International Application No. PCT/KR2021/005104 filed on Apr. 22, 2021, which in turn claims the benefit of Korean Application No. 10-2020-0049667, filed on Apr. 23, 2020, the disclosures of which are incorporated by reference into the present application.

FIELD OF THE DISCLOSURE

The present disclosure relates to a sag compensation apparatus of a machine tool and a machine tool including the same, and more particularly, to a sag compensation apparatus of a machine tool and a machine tool including the same, in which in case of sag of a cross-rail occurring due to transfer of a saddle and a ram spindle unit, hydraulic pressure compensates for the sag in real time, thereby improving machining precision.

BACKGROUND OF THE DISCLOSURE

In general, a machine tool refers to a machine used to process metal/non-metal workpieces in a desired shape and dimension using a suitable tool by using various types of cutting or non-cutting methods.

Various types of machine tools including a turning center, a vertical/horizontal machining center, a door-type machining center, a Swiss turning machine, an electric discharge machine, a horizontal NC boring machine, a CNC lathe, and a multi-tasking machining center are being widely used to suit the purpose of the corresponding work in various industrial sites.

The multi-tasking machining center, among the machine tools, refers to a turning center equipped with a multifunctional automatic tool changer (ATC) and a tool magazine in order to perform various types of processing such as turning, drilling, tapping, or milling. In the case of the multi-tasking machining center, an operator manually mounts a tool on a tool magazine when loading the tool required for a machining process or changing the tools.

In general, various types of currently used machine tools each have a control panel to which a numerical control (NC) technology or a computerized numerical control (CNC) technology is applied. The control panel is provided with a multifunctional switch or button, and a monitor.

In addition, the machine tool includes a table on which a material, i.e., a workpiece is seated and which transfers the workpiece to machine the workpiece, a palette used to prepare the workpiece to be machined, a spindle coupled to a tool or the workpiece and configured to be rotated, and a tailstock and a steady rest configured to support the workpiece during the machining process.

In general, the machine tool is provided with a transfer unit configured to transfer the table, a tool post, the spindle, the tailstock, and the steady rest along a transfer shaft in order to perform various types of machining operations.

Further, the machine tool uses a plurality of tools in order to perform various types of machining operations, and a tool magazine or a turret is used in the form of a tool storage place for receiving and storing the plurality of tools.

The machine tool uses the plurality of tools in order to perform various types of machining, and the tool magazine is used in the form of a tool storage place for receiving and storing the plurality of tools.

In addition, the machine tool is equipped with the automatic tool changer (ATC) configured to withdraw a specific tool from the tool magazine or remount the tool on the tool magazine based on an instruction of a numerical control unit in order to improve productivity of the machine tool.

Further, the machine tool is generally equipped with an automatic palette changer (APC) in order to minimize the non-machining time. The automatic palette changer (APC) automatically changes the palettes between a workpiece machining region and a workpiece loading region. The workpiece may be mounted on the palette.

In addition, the machine tools are generally classified broadly into a turning center and a machining center depending on machining methods. In general, the turning center rotates a workpiece, whereas the machining center machines a workpiece by rotating a tool.

In general, a machining center refers to a machine tool that has the automatic tool changer and changes various types of tools to perform various types of machining that may be performed by lathes, milling machines, drilling machines, boring machines, and the like. The machining center is mainly classified into a horizontal machining center and a vertical machining center in which a spindle is vertically mounted.

In general, a double-column type machining center, which is one of the large-scale machine tools, refers to a device that directly performs machining on a three-dimensional shape while changing a plurality of head attachments, unlike a lathe that performs simple machining.

In the double-column type machining center, various head attachments may be detachably mounted at a lower end of a ram spindle to machine workpieces having various shapes in various spaces and at various angles.

As described above, in the machine tool in the related art, particularly, the double-column type machining center, the sag occurs when structures such as a saddle and a ram spindle, which are relatively heavy members are transferred along a cross-rail to left and right sides in a vertical direction.

Specifically, as illustrated in FIG. 1, a larger amount of sag occurs when the saddle and the ram spindle are positioned at a left side A or a right side C of the cross-rail than when the saddle and the ram spindle are positioned at a center B of the cross-rail. Because the cross-rail is installed on a pair of columns and extends in a vertical direction, there is no portion that supports the cross-rail, the largest amount of sag occurs at the center of the cross-rail, and a relatively small amount of occurs at the left and right sides of the cross-rail.

As described above, in case of sag due to the transfer of the saddle and the ram spindle in in the machine tool in the related art, particularly, the double-column type machining center, a position of a tool at a tip of the ram spindle continuously changes, which causes a problem in that vertical straightness (Y-axis straightness) deteriorates, the machining precision deteriorates, the number of defective products increases, and the machining costs increase.

To solve the problems, the machine tool in the related art performs crowning processing on the cross-rail, but rigidity varies depending on processing condition and an operator's skill. For this reason, there are problems in that it is difficult to maintain the constant and reliable quality of the cross-rail, and the reliability deteriorates.

In addition, various sag compensation apparatuses for compensating for the sag of the cross-rail are installed in the machine tools in the related art. However, because the sag compensation apparatus has various types of software or hardware, there is a problem in that the structure is complicated, the manufacturing costs increase, and a large amount of time is required to install the sag compensation apparatus.

Moreover, the sag compensation apparatus and the machine tool including the same in the related art have problems in that a large amount of time and cost are required to install and set up the sag compensation apparatus, the non-processing time increases, the productivity of the machine tool deteriorates, and the operator's inconvenience is caused.

Furthermore, the sag compensation apparatus and the machine tool including the same in the related art cannot effectively correspond to various attachments that are often attached to or detached from an installation position on the sag compensation apparatus and the double-column type machining center, which causes problems in that the compatibility deteriorates, a large amount of costs and time are required for the maintenance and replacement, and the reliability and stability deteriorate.

As a result, there is an acute need to develop a sag compensation apparatus of a machine tool and a machine tool including the same, in which in case of sag of the cross-rail caused by the transfer of the saddle and the ram spindle unit in the machine tool, particularly, a large-scale machine tool such as the double-column type machining center, hydraulic pressure compensates for the sag in real time, such that the sag compensation apparatus may be used in various conditions such as a process of changing attachments and easily installed, the manufacturing cost and installation time are reduced by reducing the size, and the accuracy and stability are improved by minimizing the maintenance costs.

DISCLOSURE

Summary

The present disclosure has been made in an effort to solve the above-mentioned problems, and an object of the present disclosure is to provide a sag compensation apparatus of the machine tool and a machine tool including the same, the sag compensation apparatus being configured to compensate for sag of a cross-rail by recovering hydraulic pressure stored in a chamber part to a compensation unit through a flow path unit as a load applied to a cylinder unit increases in case of sag of the cross-rail caused by transfer of a saddle and a ram spindle unit and by delivering the hydraulic pressure stored in the compensation unit to the chamber part through the flow path unit when the load applied to the cylinder unit decreases on the contrary, which makes it possible to conveniently and accurately improve Y-axis straightness in real time, maximize stability and reliability of the machine tool by improving machining precision, improve the productivity of the machine tool by minimizing the non-processing time, maximize the spatial utilization and ease of installation by reducing the size of the sag compensation apparatus, improve the responsiveness and reliability by using a closed-circuit hydraulic operating method instead of a control method or a mechanical operating method of the sag compensation apparatus, improve the compatibility by conveniently changing the filling pressure of the compensation unit when the load is changed, such as when the attachments are changed, reduce the manufacturing costs and maintenance costs, and ensure an operator's convenience.

In order to achieve the above-mentioned object, the present disclosure provides a sag compensation apparatus of a machine tool, the sag compensation apparatus including: a base unit; a housing unit having a hollow portion therein and coupled and installed onto the base unit; a cylinder unit installed in the hollow portion and configured to be movable upward or downward; a support unit extending while penetrating the cylinder unit and having one side coupled to a bed or a column and the other side coupled to the base unit; a flow path unit having one side installed while penetrating a part of the housing unit; and a compensation unit installed to communicate with the other side of the flow path unit and configured to recover or supply, through the flow path unit, hydraulic pressure between the housing unit and the cylinder unit in accordance with a load of the cylinder unit.

In addition, in another exemplary embodiment of the sag compensation apparatus of the machine tool according to the present disclosure, the base unit of the sag compensation apparatus of the machine tool may include: a seating part recessed inward in an upper portion of the base unit; and a mount part protruding outward from a lower portion of the base unit.

In addition, in another exemplary embodiment of the sag compensation apparatus of the machine tool according to the present disclosure, the housing unit of the sag compensation apparatus of the machine tool may be screw-coupled to the seating part so that a height of the housing unit is adjusted.

In addition, in another exemplary embodiment of the sag compensation apparatus of the machine tool according to the present disclosure, the housing unit of the sag compensation apparatus of the machine tool may include a catching projection part formed to be stepped toward the inside of the hollow portion, and the cylinder unit may include a flange part protruding to the outside of the cylinder unit and extending in a height direction.

In addition, in another exemplary embodiment of the sag compensation apparatus of the machine tool according to the present disclosure, a chamber part may be provided in the hollow portion and formed between a lower end of the flange part and the catching projection part, one side of the flow path unit may be installed to communicate with the chamber part, the compensation unit may recover hydraulic pressure in the chamber part through the flow path unit when the load of the cylinder unit increases, and the compensation unit may supply the hydraulic pressure to the chamber part through the flow path unit when the load of the cylinder unit decreases.

In addition, in another exemplary embodiment of the sag compensation apparatus of the machine tool according to the present disclosure, the sag compensation apparatus of the machine tool may further include a cover unit having an opening part penetratively formed so that the cylinder unit is movable upward or downward, and the cover unit is connected to an upper portion of the housing unit to guide upward and downward movements of the cylinder unit.

In addition, in another exemplary embodiment of the sag compensation apparatus of the machine tool according to the present disclosure, the sag compensation apparatus of the machine tool may further include a sealing unit installed on a lower portion of the flange part and a lower portion of the cylinder unit and configured to prevent the hydraulic pressure in the chamber part from leaking.

In addition, in another exemplary embodiment of the sag compensation apparatus of the machine tool according to the present disclosure, the sag compensation apparatus of the machine tool may further include a damper unit installed between the cover unit and an upper portion of the flange part.

In addition, in another exemplary embodiment of the sag compensation apparatus of the machine tool according to the present disclosure, the sag compensation apparatus of the machine tool may further include: an accommodation unit recessed to be stepped toward the inside of the bed or the column so as to be adjacent to one side of the support unit coupled to the bed or the column; a cap unit detachably coupled to an upper portion of the accommodation unit; and a buffer unit installed between the cap unit and the accommodation unit.

In addition, to achieve another object of the present disclosure, the present disclosure provides a machine tool including: a bed; a table installed on an upper portion of the bed and configured to be transferred along the bed; a pair of columns installed at two opposite sides of the bed and extending in a height direction; a cross-rail installed to be transferred along the pair of columns; a saddle installed to be transferred vertically along the cross-rail; a ram spindle installed to be transferred along the saddle; and a sag compensation apparatus according to any one of claims 1 to 9 that is installed on a lower portion of the bed or the column, in which the sag compensation apparatus compensates for sag in real time by using hydraulic pressure in case of sag of the cross-rail caused by the transfer of the saddle and the ram spindle.

In addition, in another exemplary embodiment of the machine tool according to the present disclosure, the sag compensation apparatus of the machine tool may be provided as a plurality of sag compensation apparatuses installed below front sides of the pair of columns to face one another in a vertical direction.

In addition, in another exemplary embodiment of the machine tool according to the present disclosure, the sag compensation apparatus of the machine tool may be provided as a plurality of sag compensation apparatuses installed below front sides of the columns to be parallel to one another in a vertical direction.

The sag compensation apparatus of the machine tool and the machine tool including the same according to the present disclosure may compensate for the sag of the cross-rail by recovering the hydraulic pressure stored in the chamber part to the compensation unit through the flow path unit as the load applied to the cylinder unit increases in case of sag of the cross-rail caused by the transfer of the saddle and the ram spindle unit and by delivering the hydraulic pressure stored in the compensation unit to the chamber part through the flow path unit when the load applied to the cylinder unit decreases on the contrary, which makes it possible to conveniently and accurately improve the Y-axis straightness in real time, and maximize the stability and reliability of the machine tool by improving the machining precision.

In addition, according to the sag compensation apparatus of the machine tool and the machine tool including the same according to the present disclosure, the sag compensation apparatus is configured as a closed-circuit hydraulic system, which makes it possible to maximize the spatial utilization and ease of installation by reducing the size of the sag compensation apparatus, and improve the responsiveness and reliability by using a closed-circuit hydraulic operating method instead of a control method.

Moreover, according to the sag compensation apparatus of the machine tool and the machine tool including the same according to the present disclosure, the sag compensation apparatus is configured as a closed-circuit hydraulic system, which makes it possible to improve the compatibility by conveniently changing the filling pressure of the compensation unit when the load is changed, such as when the attachments are changed, and reduce the manufacturing costs and maintenance costs.

Furthermore, according to the sag compensation apparatus of the machine tool and the machine tool including the same according to the present disclosure, the sag compensation apparatus is configured as a closed-circuit hydraulic system that does not use a control method or a complicated structure in the related art, which makes it possible to ensure the operator's convenience and improve the productivity of the machine tool by minimizing the non-processing time.

DETAILED DESCRIPTION OF CERTAIN INVENTIVE EMBODIMENT

Figure 1:
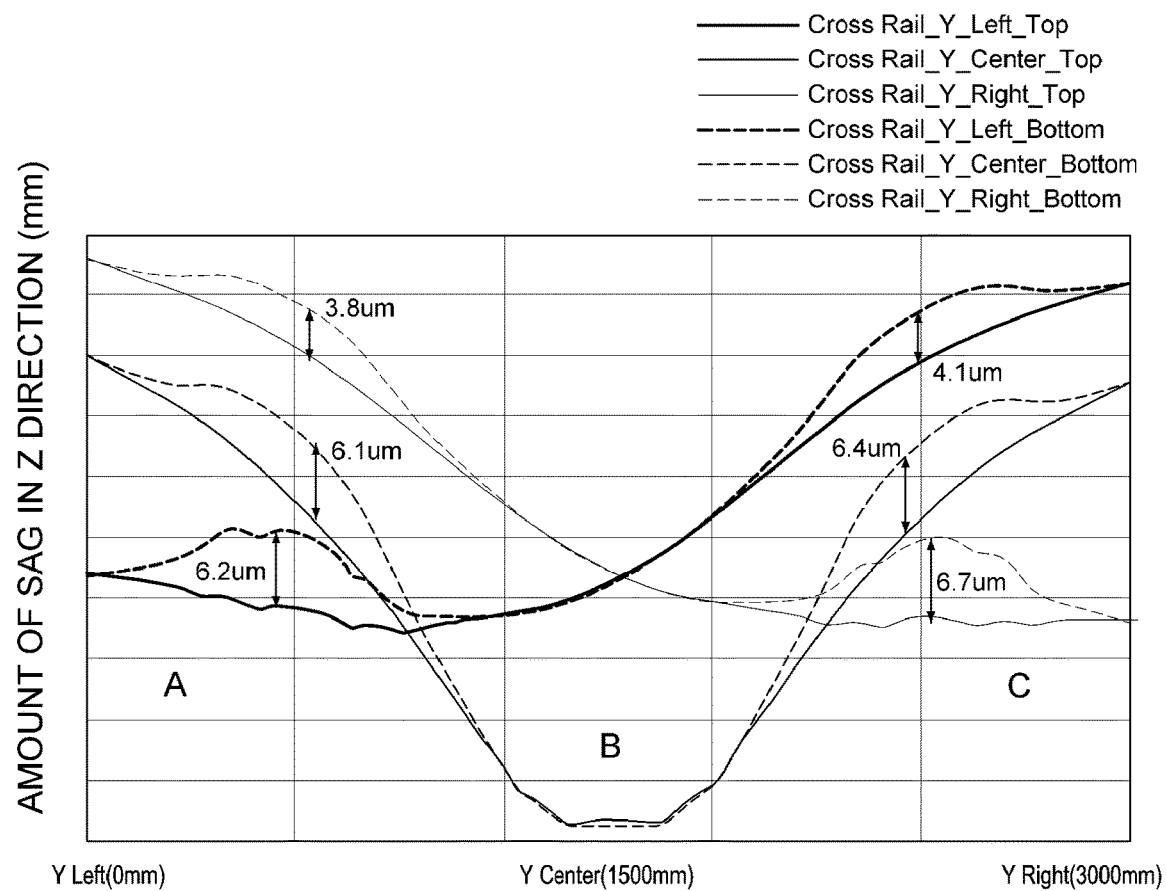
FIG. 1 is a graph illustrating the amount of sag for respective Y-axis sections of a cross-rail with respect to positions of a saddle and a ram spindle of a machine tool in the related art.

Hereinafter, a sag compensation apparatus of a machine tool and a machine tool including the same according to an exemplary embodiment of the present disclosure will be described in detail with reference to the drawings. The following exemplary embodiments are provided as examples for fully transferring the spirit of the present disclosure to those skilled in the art. Therefore, the present disclosure is not limited to the exemplary embodiments described below and may be specified as other aspects. Further, in the drawings, a size and a thickness of the apparatus may be exaggerated for convenience. Like reference numerals indicate like constituent elements throughout the specification.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Like reference numerals indicate like constituent elements throughout the specification. In the drawings, sizes and relative sizes of layers and regions may be exaggerated for clarity of description.

The terms used in the present specification are for explaining the exemplary embodiments, not for limiting the present disclosure. Unless particularly stated otherwise in the present specification, a singular form also includes a plural form. The terms "comprise (include)" and/or "comprising (including)" used in the specification are intended to specify the presence of the mentioned constituent elements, steps, operations, and/or elements, but do not exclude presence or addition of one or more other constituent elements, steps, operations, and/or elements.

Figure 2:
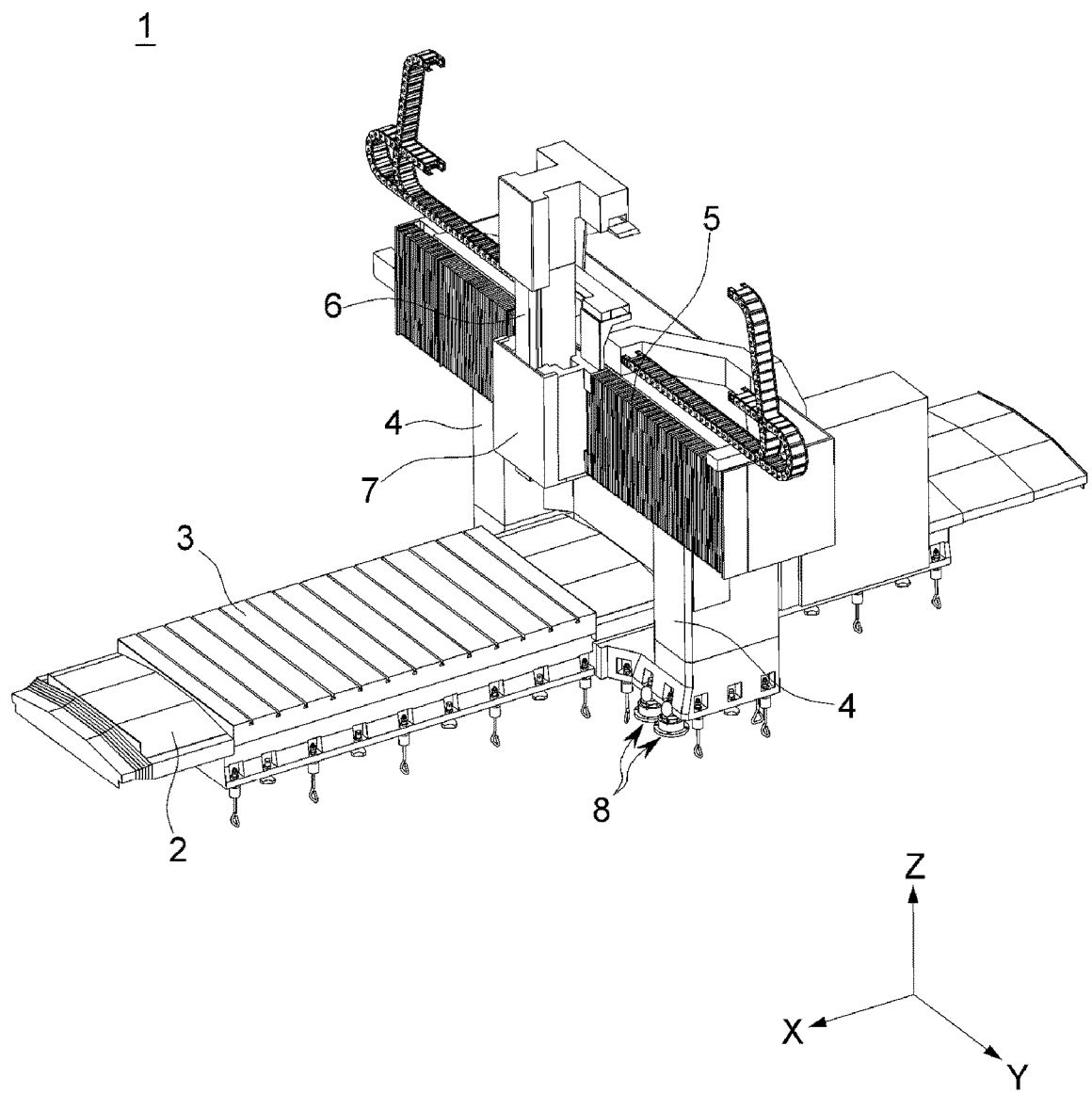
FIG. 2 is a perspective view of a machine tool including a sag compensation apparatus of the machine tool according to the present disclosure.
Figure 3:
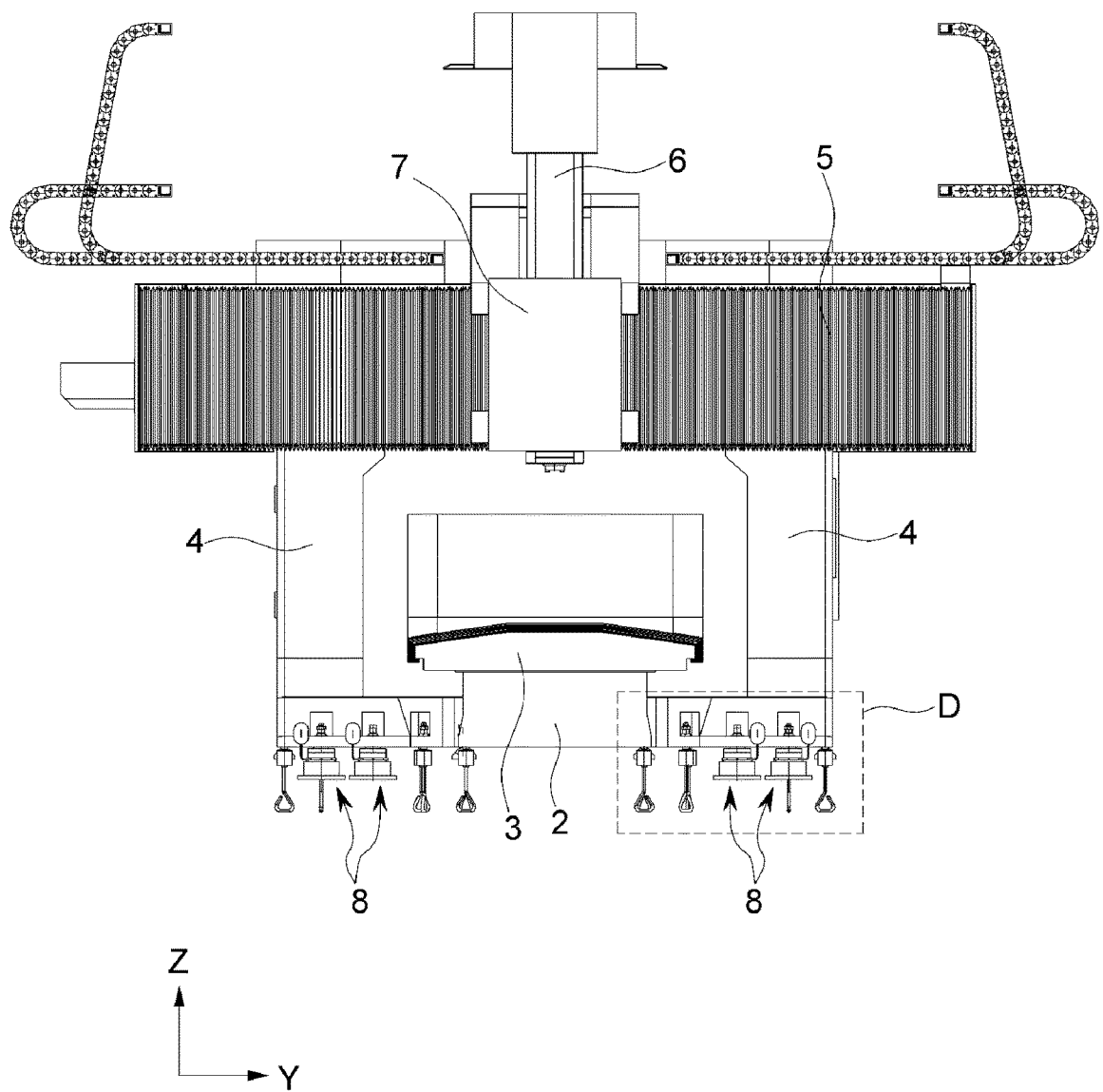
FIG. 3 is a front view of the machine tool including the sag compensation apparatus of the machine tool according to the present disclosure.
Figure 4:
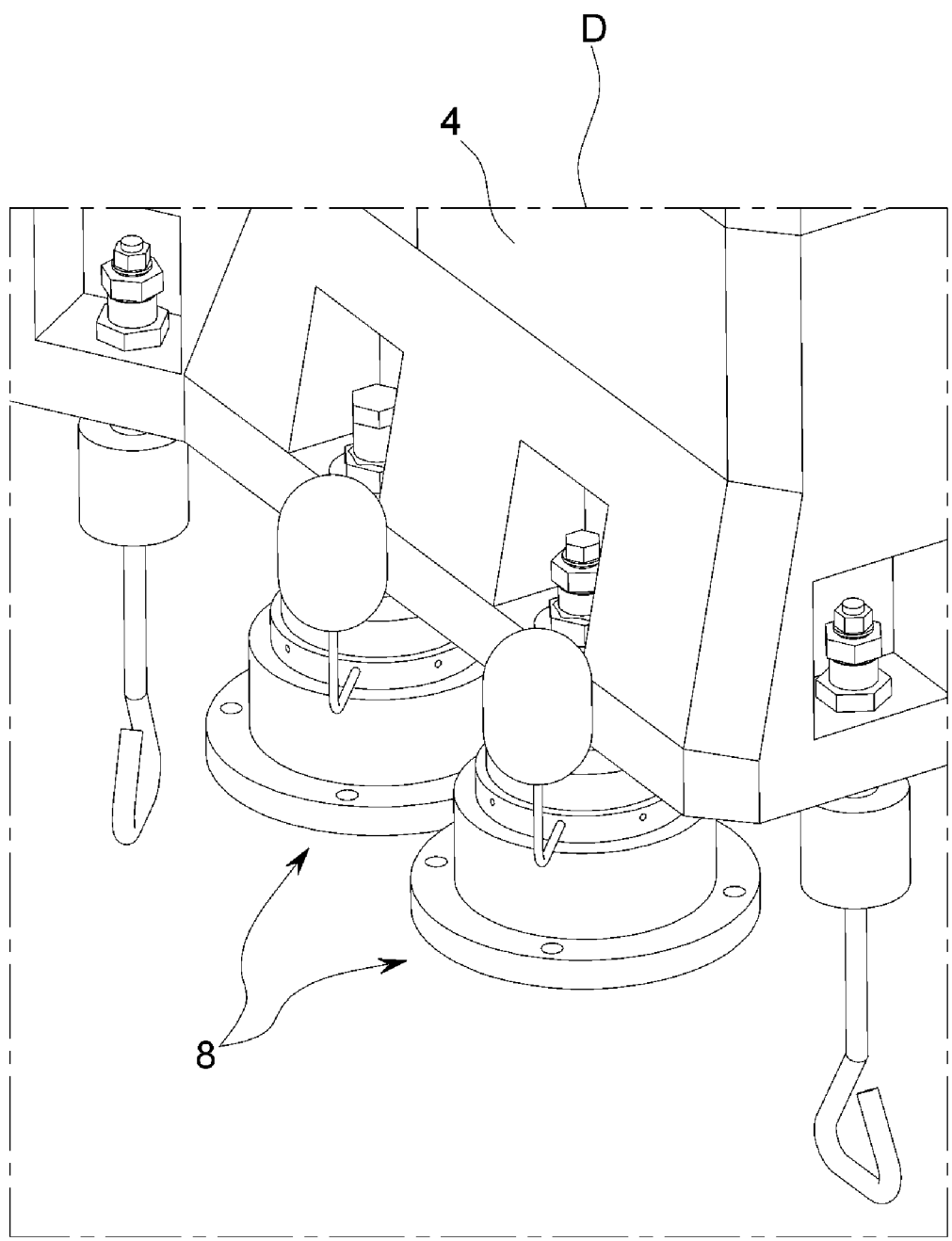
FIG. 4 is an enlarged view of part D in FIG. 3.

The terms used below are defined as follows. The term "horizontal direction" means a horizontal direction, i.e., an X-axis direction in FIGS. 2, 3, and 8 on the same member, the term "vertical direction" means a vertical direction, i.e., a Y-axis direction in FIGS. 2, 3, and 8 on the same member that is orthogonal to the horizontal direction, and the term "height direction" means an upward/downward direction, i.e., a Z-axis direction in FIGS. 2, 3, and 8 on the same member that is orthogonal to the horizontal direction and the vertical direction. In addition, the term "upward (upper)" means an upward direction in the "height direction," i.e., a direction toward an upper side in the Z-axis direction in FIGS. 2, 3, and 8, and the term "downward (lower)" means a downward direction in the "height direction," i.e., a direction toward a lower side in the Z-axis direction in FIGS. 2, 3, and 8. In addition, the term "front (forward)" means a front side in the "horizontal direction" on the same member, i.e., a side in a direction in which a saddle and a ram spindle are installed on a cross-rail in FIGS. 2, 3, and 8, and the term "rear (rearward)" means a rear side in the "horizontal direction" on the same member, i.e., a side in a direction opposite to a direction in which a cross-slide is shown in FIGS. 2, 3, and 8. In addition, the term "inward (inner)" means a side relatively close to a center of the same member, i.e., an inner side in FIGS. 2 to 8, and the term "outward (outer)" means a side relatively distant from the center of the same member, i.e., an outer side in FIGS. 2 to 8.

A sag compensation apparatus of the machine tool 8 and a machine tool 1 including the same according to the present disclosure will be described with reference to FIGS. 2 to 9. As illustrated in FIGS. 2, 3, and 8, the machine tool 1 including the sag compensation apparatus of the machine tool 8 according to the present disclosure includes a bed 2, a table 3, a pair of columns 4, a cross-rail 5, a saddle 6, a ram spindle 7, and the sag compensation apparatus 8.

The bed 2 is installed on the ground surface. In addition, the bed 2 may be installed on a base on a ground surface on which ground concrete work is completely performed.

The table 3 is installed on an upper portion of the bed 2 and may be transferred horizontally in the horizontal direction (X-axis direction) along the bed.

The pair of columns 4 is installed at two opposite sides of the bed 4 based on the vertical direction (Y-axis direction) while facing each other and extends in the height direction (Z-axis direction).

The cross-rail 5 is installed on the pair of columns and may be transferred upward or downward in the height direction along the pair of columns.

The saddle 6 is installed on the cross-rail and may be transferred vertically in the vertical direction along the cross-rail. That is, the saddle is transferred leftward or rightward in the vertical direction along the cross-rail by an operation of a driving unit.

The ram spindle 7 is installed on the saddle and may be transferred upward or downward in the height direction along the saddle. That is, the ram spindle is transferred upward or downward in the height direction along the saddle by the operation of the driving unit.

One or more sag compensation apparatuses 8 are installed below the bed or the pair of columns and improve Y-axis straightness by compensating for sag of the cross-rail in real time by using hydraulic pressure in case of sag of the cross-rail caused by the transfer of the saddle and the ram spindle.

As described above, the sag compensation apparatus of the machine tool and the machine tool including the same according to the present disclosure compensate for the sag of the cross-rail by recovering hydraulic pressure stored in a chamber part to a compensation unit through a flow path unit as a load applied to a cylinder unit increases in case of sag of the cross-rail caused by the transfer of the saddle and the ram spindle unit and by delivering the hydraulic pressure stored in the compensation unit to the chamber part through the flow path unit when the load applied to the cylinder unit decreases on the contrary, which makes it possible to conveniently and accurately improve the Y-axis straightness in real time, maximize the stability and reliability of the machine tool by improving the machining precision, and improve responsiveness and reliability.

As illustrated in FIGS. 2, 3, 4, and 8, in the machine tool 1 including the sag compensation apparatus of the machine tool according to the present disclosure, the sag compensation apparatus 8 may be provided as a plurality of sag compensation apparatuses installed below the front sides of the pair of columns 4 and facing one another in the vertical direction (Y-axis direction). That is, based on the bed, one sag compensation apparatus may be installed below the front side of the left column, and another sag compensation apparatus may be installed below the front side of the right column to face one sag compensation apparatus in the vertical direction.

In addition, as illustrated in FIGS. 2, 3, 4, and 8, in the machine tool 1 including the sag compensation apparatus of the machine tool according to the present disclosure, the plurality of sag compensation apparatuses 8 may be installed below the front sides of the columns so as to be parallel to one another in the vertical direction. That is, based on the bed, the two or more sag compensation apparatuses are installed below the front side of the left column and disposed adjacent and parallel to one another in the vertical direction.

That is, the plurality of sag compensation apparatuses may be installed below the pair of columns adjacent to the bed in order to support the sag occurring at the center of the cross-rail having no support unit when the cross-rail is installed on the pair of columns, the saddle and the ram spindle, which are heavy members, are installed at the front side of the cross-rail and transferred in the vertical and height direction. In addition, the plurality of sag compensation apparatuses may be installed at various positions and in various shapes on the bed or the columns in accordance with a load distribution or the type and size of the machine tool.

As illustrated in FIGS. 4 to 7, the sag compensation apparatus 8 of the machine tool according to the present disclosure includes a base unit 10, a housing unit 20, a cylinder unit 30, a support unit 40, a flow path unit 50, and a compensation unit 60.

The base unit 10 serves to fix and support the sag compensation apparatus on which the housing unit, the cylinder unit, and the support unit are disposed and installed. Particularly, the base unit 10 is formed in a cylindrical shape as a whole and includes a seating part 11 and a mount part 12.

The seating part 11 is recessed inward in an upper portion of the base unit 10. That is, the seating part 11 is recessed at a center of an upper portion of the base unit to have a predetermined diameter and height and provides a space in which the housing unit is installed.

The mount part 12 radially protrudes outward along an outer rim of the base unit from a lower portion of the base unit 10. The mount part is used to securely fix the base unit to a portion of a floor on which ground concrete work is completely performed and a double-column type machining center, which is a large-scale machine tool, is installed, by anchor bolts or grouting, thereby improving the stability. In addition, to perform maintenance on or remove the sag compensation apparatus, the sag compensation apparatus may be conveniently disassembled by simply removing the anchor bolts, which makes it possible to reduce the installation and maintenance time and decrease the size.

The housing unit 20 has a hollow portion 21 therein and is coupled and installed onto the base unit 10. Specifically, the housing unit 20 is screw-coupled to the seating part 11 so that a height thereof may be adjusted. That is, a pair of internal and external threads is formed on an outer peripheral surface of a lower portion of the housing unit 20 and an inner peripheral surface of the seating part, such that the housing unit is detachably screw-coupled to the seating part of the base unit. A basic level of the sag compensation apparatus may be conveniently adjusted depending on an inclination degree or gradient of the ground surface, which makes it possible to ensure the operator's convenience and improve the stability and reliability of the equipment. In addition, the housing unit 20 is formed in a hollow cylindrical shape having an interior penetrated entirely and defines an external shape of the sag compensation apparatus.

The cylinder unit 30 is installed in the hollow portion 21 of the housing unit and configured to be movable upward or downward in the height direction. That is, the cylinder unit 30 is inserted and installed in the hollow portion 21 of the housing unit and configured to be movable upward or downward in the height direction by a load applied to the cylinder unit 30 by the transfer of the saddle and the ram spindle. In addition, the cylinder unit is provided in the form of a cylindrical rod having a predetermined diameter, but the present disclosure is not necessarily limited thereto.

The support unit 40 extends in the height direction while penetrating the cylinder unit 30. In addition, one side of the support unit is coupled to a lower portion of the bed 2 or the columns 4, and the other side of the support unit is coupled to the base unit while penetrating a part of the base unit. That is, the support unit 40 serves to securely fix and support the bed or the columns and the base unit in order to stably compensate for the sag when a load is increased by the transfer of the saddle and the ram spindle. The support unit may be configured as a bolt, a rivet, or the like, but the present disclosure is not necessarily limited thereto. In addition, the support unit has a screw thread provided on an outer peripheral surface thereof, such that the support unit may be easily and detachably screw-coupled to the bed or the columns and the base unit.

One side of the flow path unit 50 penetrates a part of the housing unit, and the other side of the flow path unit 50 is installed to communicate with a storage part of the compensation unit. That is, the flow path unit serves to deliver hydraulic pressure stored in the chamber part, which will be described below, to the delivery part of the compensation unit or deliver again the hydraulic pressure stored in the storage part of the compensation unit to the chamber part in accordance with the upward or downward movement of the cylinder unit in the height direction when a load is increased or decreased by the transfer of the saddle and the ram spindle.

The compensation unit 60 is installed to communicate with the other side of the flow path unit 50 and serves to recover or supply, through the flow path unit, the hydraulic pressure between the housing unit and the cylinder unit in accordance with the increase or decrease of the load of the cylinder unit.

In addition, the housing unit 20 has a catching projection part 22 formed to be stepped toward the inside of the hollow portion 21. That is, the catching projection part 22 is stepped horizontally in the hollow portion 21 and directed toward a center of the housing unit, thereby preventing the separation of a flange part of the cylinder unit, which will be described below, when the flange part of the cylinder unit moves downward and defining the chamber part together with a lower portion of the flange part.

In addition, the cylinder unit 30 has the flange part 31 protruding from a center of the cylinder unit and to the outside of the cylinder unit and extending in the height direction. That is, the flange part 31 has a predetermined diameter, protrudes from a central portion of the cylinder unit to the outside of the flange part, and extends in the height direction.

As described above, the housing unit 20 has the catching projection part, and the cylinder unit has the flange part, thereby defining the chamber part. That is, the chamber part 23 is provided in the hollow portion of the housing unit and formed between a lower end of the flange part and the catching projection part, thereby defining a space for storing hydraulic pressure. Specifically, the chamber part is provided in the form of a doughnut having a penetrated interior and a predetermined volume and stores the hydraulic pressure.

In addition, because one side of the flow path unit is installed to communicate with the chamber part, the compensation unit recovers the hydraulic pressure in the chamber part through the flow path unit in case that a load of the cylinder unit increases. In contrast, in case that the load of the cylinder unit decreases, the compensation unit supplies the hydraulic pressure to the chamber part through the flow path unit.

Figure 5:
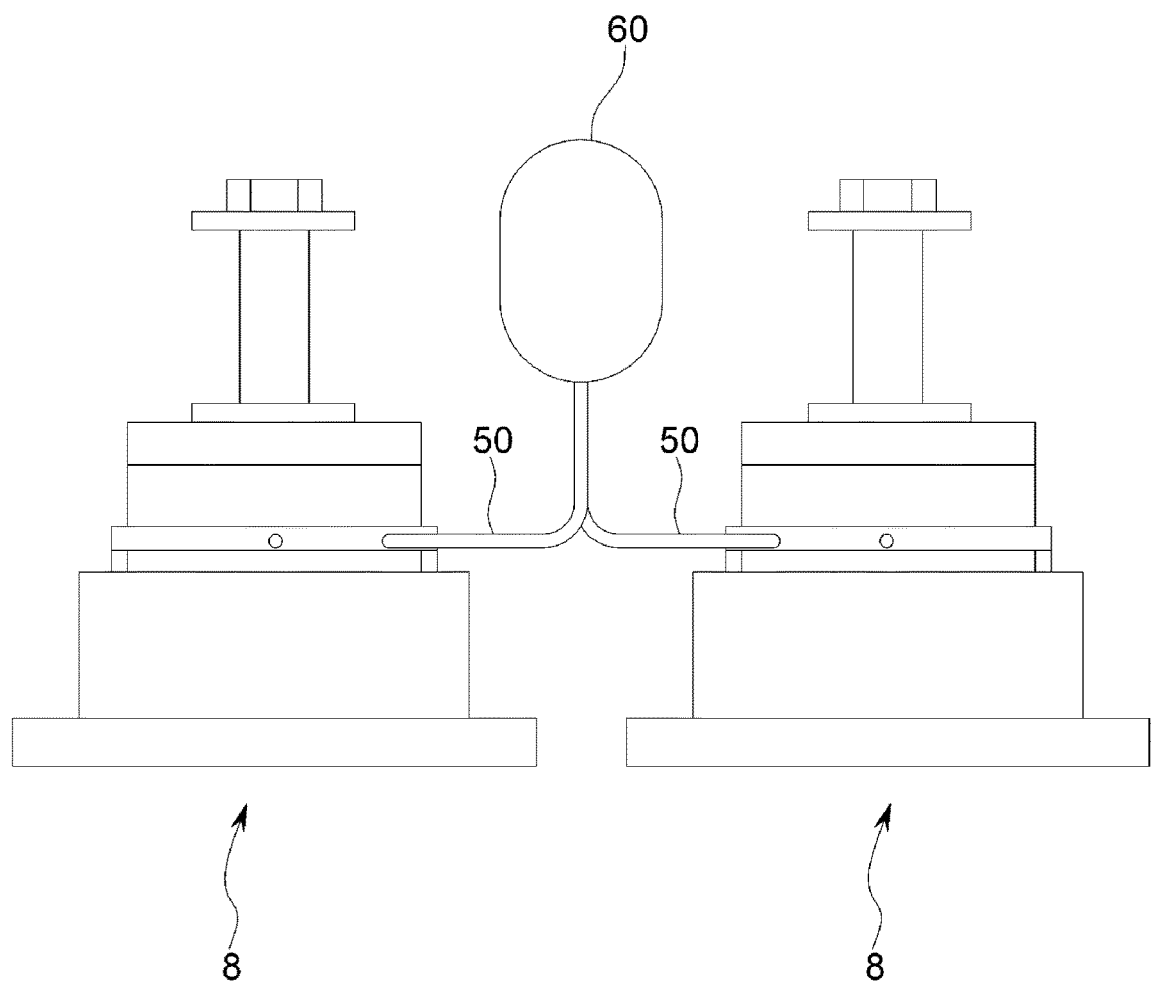
FIG. 5 is a conceptual view of a module shape in which the sag compensation apparatus of the machine tool according to the present disclosure is connected to one compensation unit.

That is, as illustrated in FIG. 5, specifically, when the load of the cylinder unit increases, as indicated by the arrow, through the bed or the columns as the sag of the cross-rail increases due to the transfer of the saddle and the ram spindle, the cylinder unit moves downward in the height direction, and hydraulic pressure O stored in the chamber part moves to a storage part 61 of the compensation unit through the flow path unit. Therefore, the height of the column of the machine tool decreases, and the Y-axis straightness is maintained constantly. In contrast, when the load of the cylinder unit decreases and the cross-rail does not sag as the saddle and the ram spindle are transferred, the cylinder unit moves upward in the height direction, and the hydraulic pressure stored in the storage part of the compensation unit is introduced into the chamber part through the flow path unit. Therefore, the height of the column of the machine tool increases, and the Y-axis straightness is maintained constantly.

As described above, the sag compensation apparatus of the machine tool according to the present disclosure compensates for the sag of the cross-rail by recovering hydraulic pressure stored in a chamber part to a compensation unit through a flow path unit as a load applied to a cylinder unit increases in case of sag of the cross-rail caused by the transfer of the saddle and the ram spindle unit and by delivering the hydraulic pressure stored in the compensation unit to the chamber part through the flow path unit when the load applied to the cylinder unit decreases on the contrary, which makes it possible to conveniently and accurately improve the Y-axis straightness in real time, maximize the stability and reliability of the machine tool by improving the machining precision. The sag compensation apparatus is configured as a closed-circuit hydraulic system, which makes it possible to maximize the spatial utilization and ease of installation by reducing the size of the sag compensation apparatus, and improve the responsiveness and reliability by using a closed-circuit hydraulic operating method instead of a control method.

Figure 6:
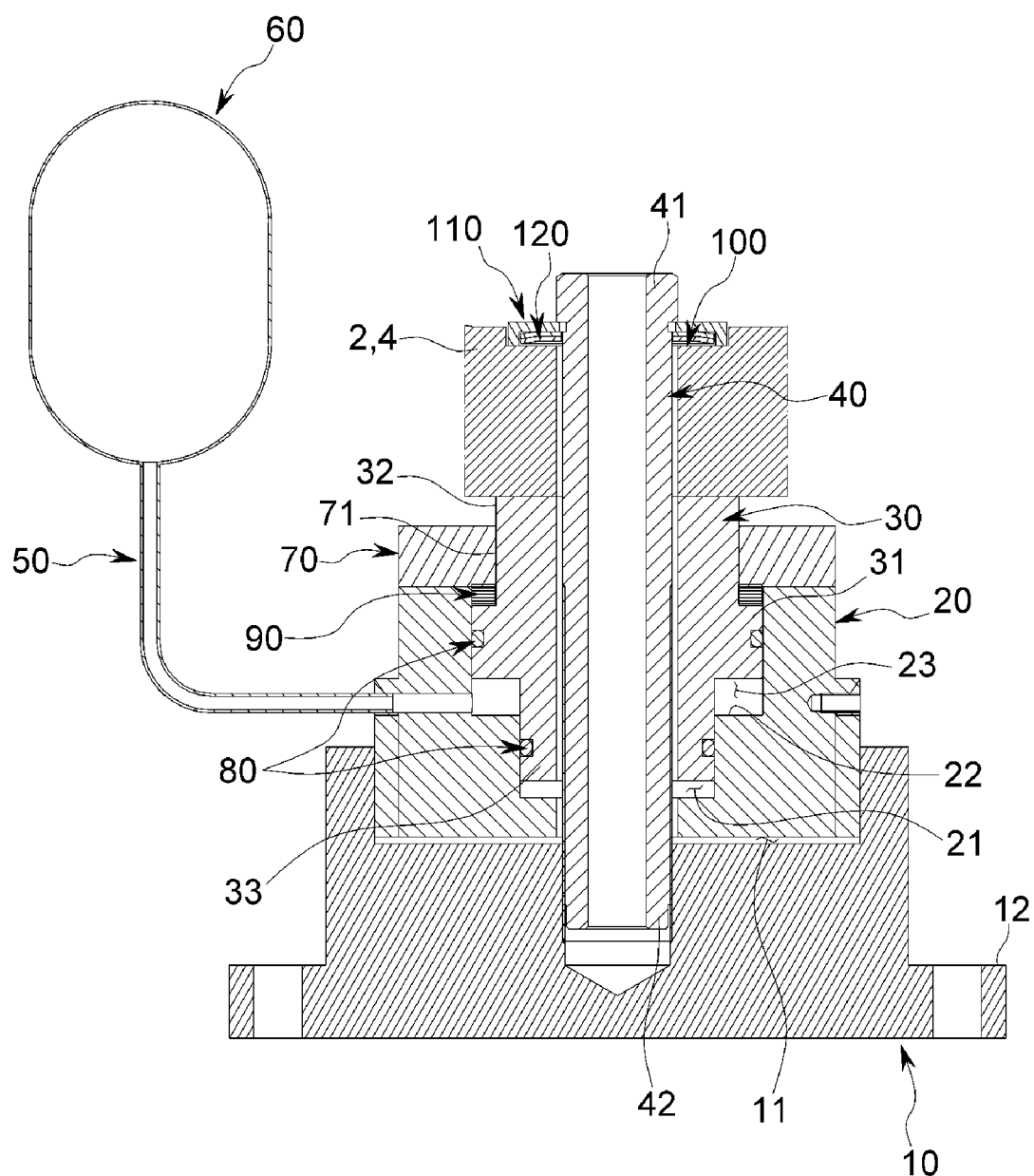
FIG. 6 is a cross-sectional view of the sag compensation apparatus of the machine tool according to the present disclosure.
Figure 7:
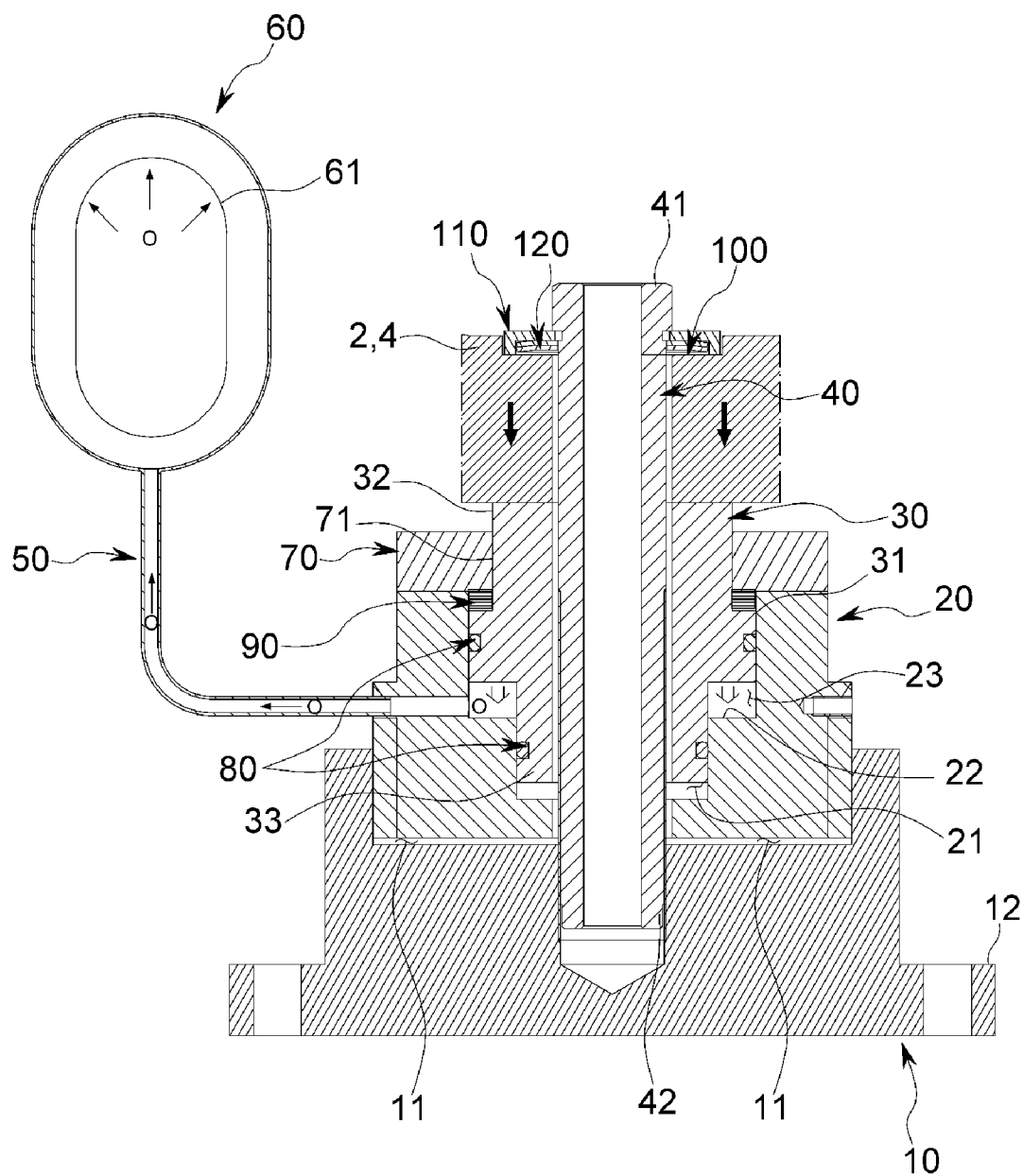
FIG. 7 is a view for explaining an operating state concept of the sag compensation apparatus of the machine tool according to the present disclosure.
Figure 8:
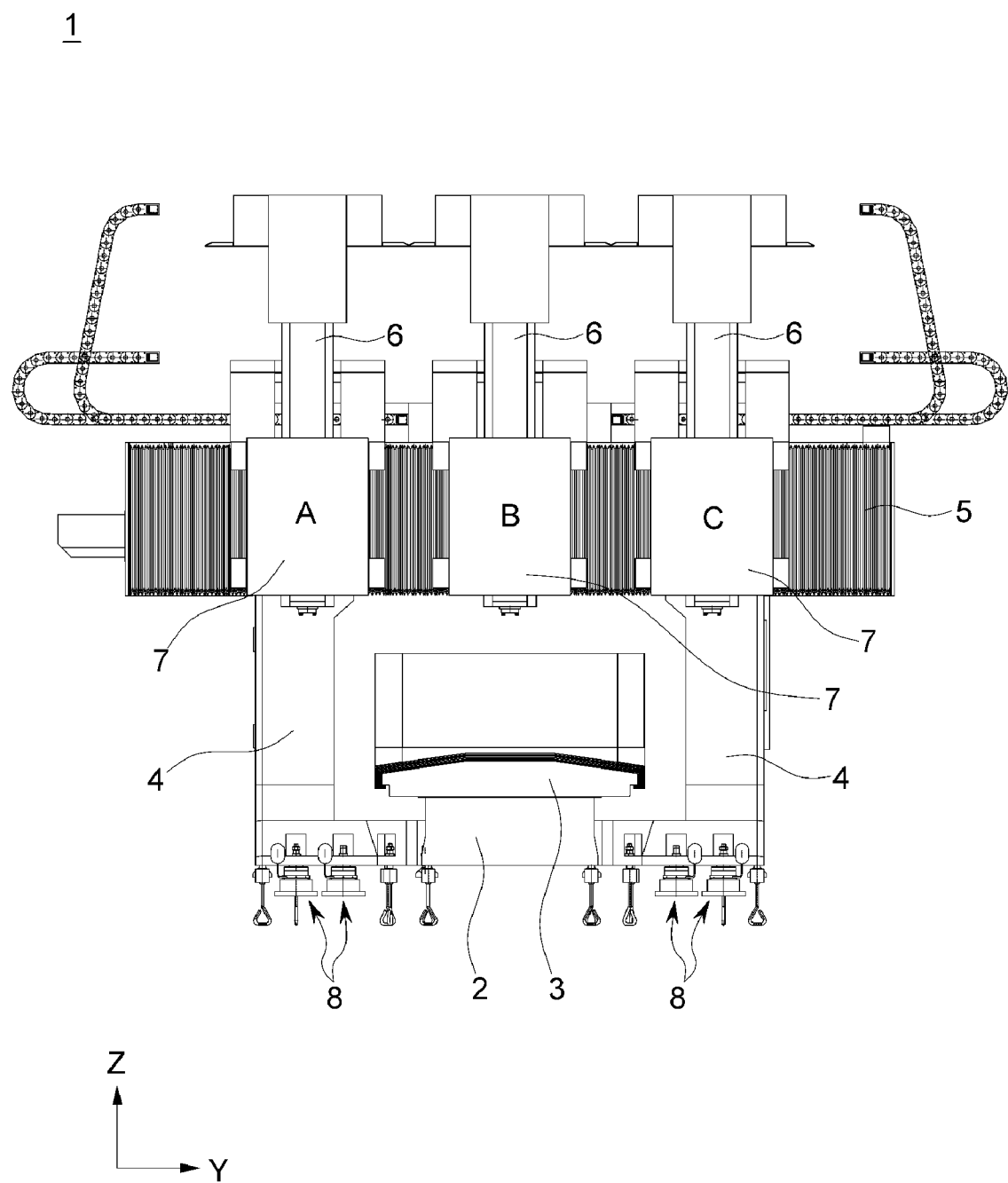
FIG. 8 is a view illustrating a position state according to transfer of a saddle and a ram spindle of the machine tool including the sag compensation apparatus of the machine tool according to the present disclosure.

In addition, as illustrated in FIGS. 6 and 7, the sag compensation apparatus 8 of the machine tool according to the present disclosure may further include a cover unit 70, a sealing unit 80, and/or a damper unit 90.

The cover unit 70 has an opening part 71 penetratively formed so that the cylinder unit 20 may move upward or downward in the height direction. The cover unit 70 is coupled to an upper portion of the housing unit 20 to guide the upward and downward movements of the cylinder unit 20. That is, the cover unit 70 is detachably coupled to the upper portion of the housing unit and enables the cylinder unit to easily move upward or downward in accordance with the amount of load applied to the cylinder unit in accordance with the transfer of the saddle and the ram spindle.

In addition, the cover unit prevents chips, which are produced during processing, cutting oil, or dust or foreign substances at ordinary times from entering the housing unit, which makes it possible to increase the maintenance costs and time by improving durability and lifespan, and improve the productivity by reducing the non-processing time.

The sealing unit 80 is installed on the flange part 31 of the cylinder unit and a lower portion 33 of the cylinder unit and prevents the hydraulic pressure stored in the chamber part from leaking. That is, the sealing unit 80 is provided in the form of an O-ring to prevent the hydraulic pressure stored in the chamber part from leaking. The sealing unit 80 is inserted and installed into the flange part, which is adjacent to the upper portion of the chamber part, and the lower portion of the cylinder that is adjacent to the lower portion of the chamber part.

The damper unit 90 is installed between the cover unit 70 and the upper portion of the flange part. That is, the damper unit is provided in the form of a coil spring or a flat spring. The damper unit cancels out hydraulic pressure hunting of the compensation unit and prevents damage to the cylinder unit, the housing unit, and the base unit due to a sudden load.

In addition, as illustrated in FIGS. 6 and 7, the sag compensation apparatus 8 of the machine tool according to the present disclosure may further include an accommodation unit 100, a cap unit 110, and/or a buffer unit 120.

The accommodation unit 100 is recessed to be stepped toward the inside of the bed or the columns and adjacent to one side of the support unit coupled to the bed or the column.

The cap unit 110 is detachably coupled to an upper portion of the accommodation unit and protects a space of the accommodation unit.

The buffer unit 120 is installed between the cap unit and the accommodation unit. That is, the buffer unit is provided in the form of a coil spring or a flat spring. The damper unit cancels out hydraulic pressure hunting of the compensation unit and prevents damage to the cylinder unit, the housing unit, and the base unit due to a sudden load. Specifically, the buffer unit secondarily and additionally cancels out the hydraulic pressure hunting of the compensation unit when the damper unit primarily cancels out the hydraulic pressure hunting of the compensation unit, which makes it possible to maximize the stability and reliability of the sag compensation apparatus and improve the responsiveness and compatibility. In addition, the buffer unit secondarily protects the constituent elements of the sag compensation apparatus, such as the cylinder unit and the housing unit, from a load suddenly applied to the cylinder unit, thereby improving the durability and lifespan and reducing the maintenance costs.

In addition, as illustrated in FIG. 5, as necessary, the single compensation unit may be provided in the form of a module and connected to the plurality of chamber parts through the flow path units. That is, the flow path unit may be divided into two flow paths that communicate with the two chamber parts, respectively. Alternatively, two or more flow path units are provided in the form of modules that connect the chamber parts and the single compensation unit. Therefore, as necessary, a hydraulic system may be modified and used depending on the type and size of the machine tool and the type of the attachment to be used, which makes it possible to ensure the operator's convenience, improve the compatibility of the equipment, and reduce the installation costs.

A sag compensation principle and an operational effect of the sag compensation apparatus of the machine tool and the machine tool including the same according to the present disclosure will be described with reference to FIGS. 7 to 9.

In FIG. 8, when the saddle and the ram spindle move to the center B of the cross-rail, the sag of the cross-rail relatively increases because there is no support unit of the cross-rail. Therefore, the load of the cylinder unit increases through the bed or the column. That is, as illustrated in FIG. 7, specifically, when the load of the cylinder unit increases, as indicated by the arrow, through the bed or the columns as the sag of the cross-rail increases due to the transfer of the saddle and the ram spindle, the cylinder unit moves downward in the height direction, and the hydraulic pressure O stored in the chamber part moves to the storage part 61 of the compensation unit through the flow path unit. In contrast, when the saddle and the ram spindle are transferred to the left side A or the right side C, the saddle and the ram spindle are relatively supported by the columns, the sag of the cross-rail is smaller than that at the center B. Further, as the load of the cylinder unit decreases, the cylinder unit moves upward in the height direction, and the hydraulic pressure stored in the storage part of the compensation unit is introduced into the chamber part through the flow path unit.

Therefore, even in case that the saddle and the ram spindle are continuously and repeatedly transferred from the left side A of the cross-rail to the right side C of the cross-rail via the center B of the cross-rail or in the reverse direction, sag in amount larger than the amount of sag of the rigid body of the cross-rail in the related art occurs, and the sag cancels out the amount of sag in FIG. 1, which makes it possible to always constantly maintain the position (Y-axis straightness) of the tip of the ram spindle based on the Z-axis direction.

Figure 9:
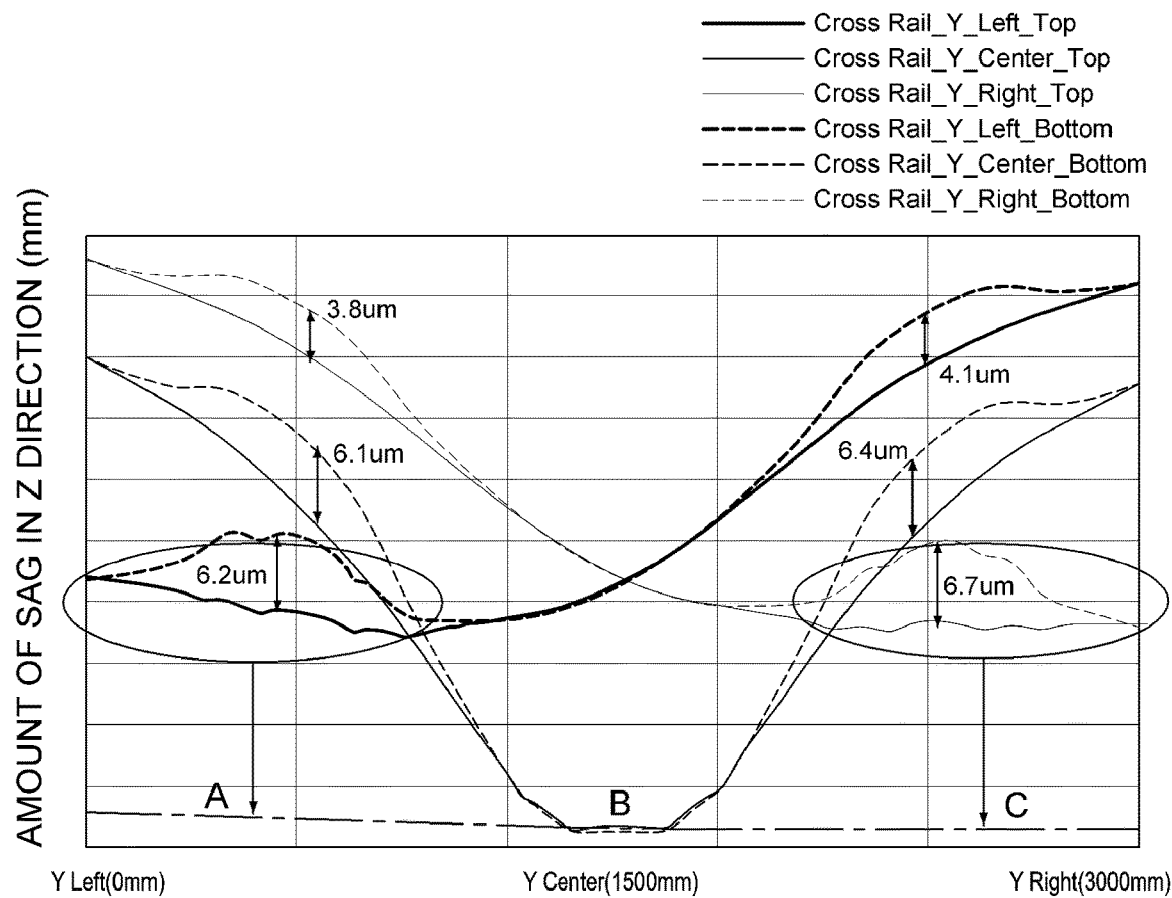
FIG. 9 is a graph illustrating sag compensation performed in accordance with the amount of sag for respective Y-axis sections of a cross-rail with respect to positions of the saddle and the ram spindle in the sag compensation apparatus of the machine tool and machine tool including the same according to the present disclosure.

That is, as indicated by the one-dot chain lines on the graph of FIG. 9, the position (Y-axis straightness) of the tip of the ram spindle based on the Z-axis direction is always continuously maintained as indicated by the one-dot chain lines by canceling out the amount of sag in FIG. 1 by generating sag in amount, which is larger than the amount of sag of the rigid body of the cross-rail in the related art, while corresponding to the increase or decrease in load of the cylinder unit made by the transfer of the saddle and the ram spindle by adjusting the sag compensation apparatus, which is operated by the hydraulic pressure, and adjusting the hydraulic pressure, the installation position of the sag compensation apparatus, and the number of sag compensation apparatuses, which makes it possible to maximize the stability and reliability of the machine tool by improving the machining precision. The sag compensation apparatus is configured as a closed-circuit hydraulic system, which makes it possible to maximize the spatial utilization and ease of installation by reducing the size of the sag compensation apparatus, and improve the responsiveness and reliability by using a closed-circuit hydraulic operating method instead of a control method. The compatibility is improved by conveniently changing the filling pressure of the compensation unit when the load is changed, such as when the attachments are changed, which makes it possible to reduce the manufacturing costs and maintenance costs. The sag compensation apparatus is configured as a closed-circuit hydraulic system that does not use a control method or a complicated structure in the related art, which makes it possible to ensure the operator's convenience and improve the productivity of the machine tool by minimizing the non-processing time.

While the present disclosure has been described above with reference to the exemplary embodiments of the present disclosure in the detailed description of the present disclosure, it may be understood, by those skilled in the art or those of ordinary skill in the art, that the present disclosure may be variously modified and changed without departing from the spirit and scope of the present disclosure disclosed in the claims. Accordingly, the technical scope of the present disclosure should not be limited to the contents disclosed in the detailed description of the specification but should be defined only by the claims.

DESCRIPTION OF MAIN REFERENCE NUMERALS OF DRAWINGS

1: Machine tool
2: Bed
3: Table
4: Column
5: Cross-rail
6: Saddle
7: Ram spindle
8: Sag compensation apparatus
10: Base unit
20: Housing unit
30: Cylinder unit
40: Support unit
50: Flow path unit
60: Compensation unit
70: Cover unit
80: Sealing unit
90: Damper unit
100: Accommodation unit
110: Cap unit
120: Buffer unit

The invention claimed is:

1. A sag compensation apparatus of a machine tool, the sag compensation apparatus comprising:
a base unit;
a housing unit having a hollow portion therein and coupled and installed onto the base unit;
a cylinder unit installed in the hollow portion and configured to be movable upward or downward;
a support unit extending while penetrating the cylinder unit and having one side coupled to a bed or a column and the other side coupled to the base unit;
a flow path unit having one side installed while penetrating a part of the housing unit; and
a compensation unit installed to communicate with the other side of the flow path unit and configured to recover or supply, through the flow path unit, hydraulic pressure between the housing unit and the cylinder unit in accordance with a load of the cylinder unit,
wherein,
the housing unit comprises a catching projection part formed to be stepped toward the inside of the hollow portion, and the cylinder unit comprises a flange part protruding to the outside of the cylinder unit and extending in a height direction,
a chamber part is provided in the hollow portion and formed between a lower end of the flange part and the catching projection part,
one side of the flow path unit is installed to communicate with the chamber part,
the compensation unit recovers hydraulic pressure in the chamber part through the flow path unit when the load of the cylinder unit increases, and
the compensation unit supplies the hydraulic pressure to the chamber part through the flow path unit when the load of the cylinder unit decreases.

2. The sag compensation apparatus of claim 1, wherein the base unit comprises:
a seating part recessed inward in an upper portion of the base unit; and
a mount part protruding outward from a lower portion of the base unit.

3. The sag compensation apparatus of claim 2, wherein the housing unit is screw-coupled to the seating part so that a height of the housing unit is adjusted.

4. The sag compensation apparatus of claim 1, comprising:
a cover unit having an opening part penetratively formed so that the cylinder unit is movable upward or downward, and the cover unit is connected to an upper portion of the housing unit to guide upward and downward movements of the cylinder unit.

5. The sag compensation apparatus of claim 4, comprising:
a damper unit installed between the cover unit and an upper portion of the flange part.

6. The sag compensation apparatus of claim 1, comprising:
a sealing unit installed on a lower portion of the flange part and a lower portion of the cylinder unit and configured to prevent the hydraulic pressure in the chamber part from leaking.

7. The sag compensation apparatus of claim 1, comprising:
- an accommodation unit recessed to be stepped toward the inside of the bed or the column so as to be adjacent to one side of the support unit coupled to the bed or the column;
- a cap unit detachably coupled to an upper portion of the accommodation unit; and
- a buffer unit installed between the cap unit and the accommodation unit.

8. A machine tool comprising:
- a bed;
- a table installed on an upper portion of the bed and configured to be transferred along the bed;
- a pair of columns installed at two opposite sides of the bed and extending in a height direction;
- a cross-rail installed to be transferred along the pair of columns;
- a saddle installed to be transferred vertically along the cross-rail;
- a ram spindle installed to be transferred along the saddle; and
- a sag compensation apparatus according to claim 1 that is installed on a lower portion of the bed or the column,
- wherein the sag compensation apparatus compensates for sag in real time by using hydraulic pressure in case of sag of the cross-rail caused by the transfer of the saddle and the ram spindle.

9. The machine tool of claim 8, wherein the sag compensation apparatus is provided as a plurality of sag compensation apparatuses installed below front sides of the pair of columns to face one another in a vertical direction.

10. The machine tool of claim 8, wherein the sag compensation apparatus is provided as a plurality of sag compensation apparatuses installed below front sides of the columns to be parallel to one another in a vertical direction.

* * * * *